United States Patent

Wo

Patent Number: 5,896,844
Date of Patent: Apr. 27, 1999

[54] VARIABLE FUEL INJECTION SYSTEM FOR INTERNAL COMBUSTION ENGINES

[75] Inventor: Cheong Han Wo, Seoul, Rep. of Korea

[73] Assignee: Hyundai Motor Company, Seoul, Rep. of Korea

[21] Appl. No.: 08/956,824

[22] Filed: Oct. 23, 1997

[30] Foreign Application Priority Data

Oct. 25, 1996 [KR] Rep. of Korea .................. 96-48702

[51] Int. Cl.$^6$ ...................................... F02M 51/00
[52] U.S. Cl. ............................... 123/478; 123/444
[58] Field of Search ........................... 123/444, 478

[56] References Cited

U.S. PATENT DOCUMENTS

| | | |
|---|---|---|
| 3,574,346 | 4/1971 | Sulich ........................ 123/444 |
| 3,760,590 | 9/1973 | Bader ......................... 60/261 |
| 4,043,304 | 8/1977 | Stumpp et al. ................ 123/473 |
| 4,150,641 | 4/1979 | Masui ......................... 123/444 |
| 4,413,508 | 11/1983 | Kawamura et al. ............. 123/478 |
| 5,647,316 | 7/1997 | Hellen et al. ................ 123/444 |

*Primary Examiner*—Erick R. Solis
*Attorney, Agent, or Firm*—Christie, Parker & Hale, LLP

[57] ABSTRACT

A variable fuel injection system for internal combustion engines is disclosed. In the injection system, a first control unit controls electromotive force for the solenoid coil of a fuel injector, thus controlling the amount of fuel to be injected from the nozzle of the injector into the combustion chamber of an engine. A second control unit controls the amount of actuating oil for the first control unit in accordance with an engine load, thus allowing the first control unit to control the electromotive force for the solenoid coil according to the engine load. The system controllably feeds fuel into the combustion chamber of an engine according to an engine load, thus conserving fuel with the amount of harmful exhaust gas being reduced.

3 Claims, 2 Drawing Sheets

5,896,844

VARIABLE FUEL INJECTION SYSTEM FOR INTERNAL COMBUSTION ENGINES

BACKGROUND OF THE INVENTION

1. Field of the Invention

The present invention relates, in general, to a fuel injection system used for injecting fuel into the combustion chamber of an internal combustion engine and, more particularly, to a variable fuel injection system capable of controllably feeding fuel into the combustion chamber by controlling electromotive force applied to a solenoid coil, thus effectively feeding an appropriate amount of fuel to the engine in accordance with an engine load.

2. Description of the Prior Art

FIG. 3 shows the construction of a typical variable fuel injector for internal combustion engines. As shown in the drawing, the injector is comprised of an injector body 11. An internal passage 12 is axially formed in the body 11 and is connected to a fuel pump, while an injection nozzle 13 is formed at the tip of the body 11. The nozzle 13 communicates with the internal passage 12, thus injecting fuel under pressure. A needle valve 14 is interiorly provided in the body 11 at a position around the nozzle 13 so as to selectively close the nozzle 13. A plunger 15 is integrated with the top end of the needle valve 14 and is movably received in the body 11. The plunger 15, with the needle valve 14, is selectively moved in the body 11 under the control of a solenoid coil 16, thus opening or closing the nozzle 13. The plunger 15 is normally biased by a return spring 17, thus being elastically returned to its original position when the solenoid coil 16 is turned off. At the original position, the plunger 15 allows the needle valve 14 to close the nozzle 13. Provided at the inlet end of the internal passage 12 of the injector body 11 is a filter 18 used for filtering fuel.

When the solenoid coil 16 is turned on, the coil 16 forms an electromagnet, thus retracting the plunger 15 in the body 11. Therefore, the needle valve 14 opens the nozzle 13.

When the nozzle 13 is opened as described above, pressurized fuel is injected from the injector body 11 into the combustion chamber of an engine through the nozzle 13.

On the other hand, when the solenoid coil 16 is turned off, a magnetic field is removed from the coil 16, thus removing any external force from the plunger 15. The plunger free from any external force is elastically returned to its original position due to the restoring force of the return spring 17, thus allowing the needle valve 14 to close the nozzle 13. In such a case, the injector does not inject the pressurized fuel into the combustion chamber.

Therefore, the amount of injected fuel of the above injector is determined by the length of time the solenoid coil is turned on, thus opening the nozzle. The typical injector fails to appropriately control the amount of injected fuel in accordance with an engine load, thereby overly consuming fuel and increasing the amount of the harmful exhaust gas of an engine.

SUMMARY OF THE INVENTION

Accordingly, the present invention has been made keeping in mind the above problems occurring in the prior art, and an object of the present invention is to provide a variable fuel injection system for internal combustion engines, which controls electromotive force for a solenoid coil in accordance with an engine load, thus controlling the opening area of a nozzle and controllably feeding fuel into the combustion chamber according to the engine load, and conserving fuel with the amount of harmful exhaust gas being reduced.

In order to accomplish the above object, the present invention provides a variable fuel injection system for internal combustion engines, comprising a fuel injector provided with a solenoid coil for controlling a fuel injection nozzle, further comprising: a first control unit adapted for controlling electromotive force for the solenoid coil of the fuel injector, thus controlling the amount of fuel to be injected from the nozzle; and a second control unit adapted for controlling the amount of oil for the first control unit in accordance with an engine load, thus allowing the first control unit to control the electromotive force for the solenoid coil according to the engine load.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
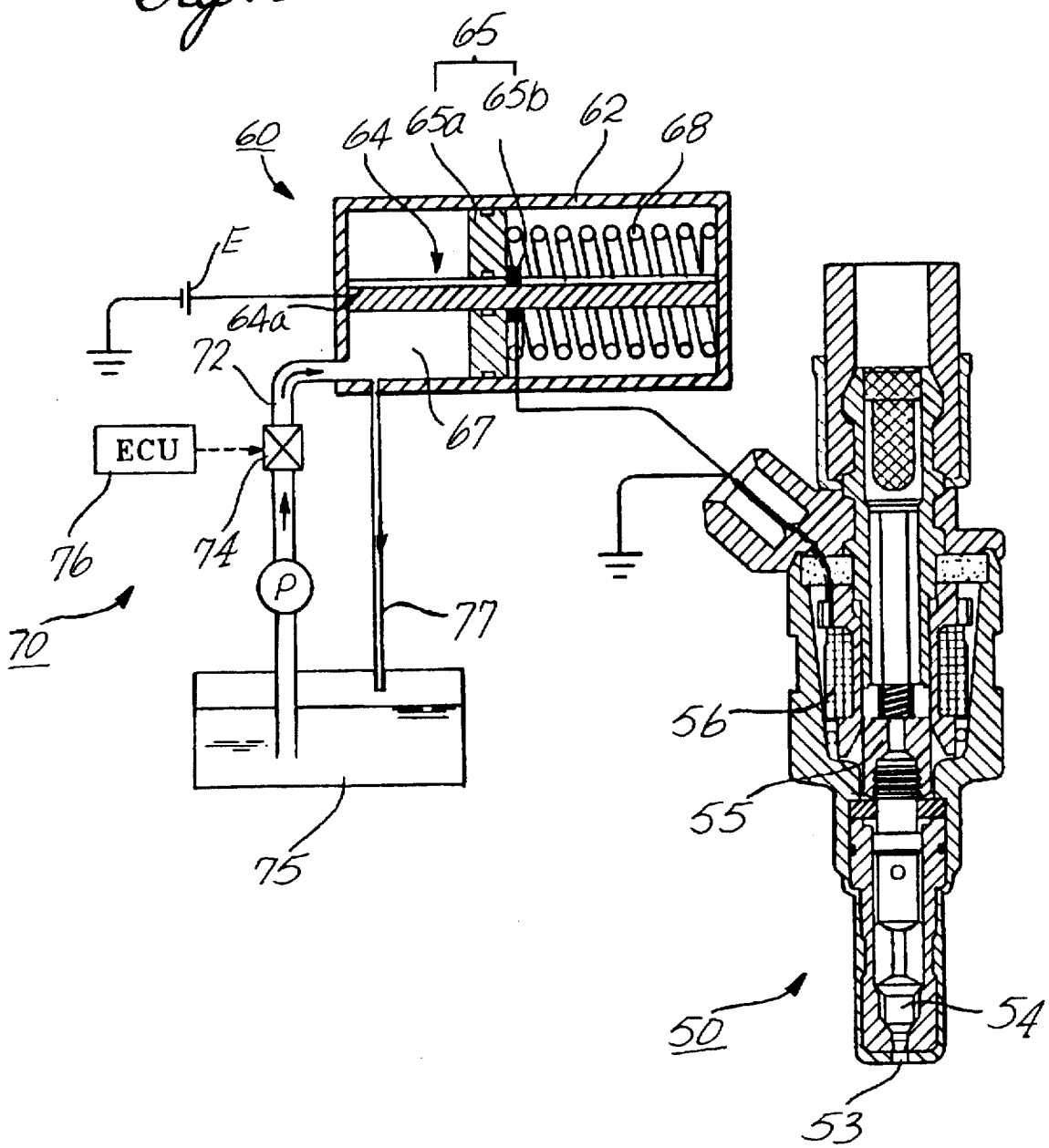
FIG. 1 is a sectional view showing the construction of a variable fuel injection system for internal combustion engines in accordance with the preferred embodiment of the present invention.
Figure 2:
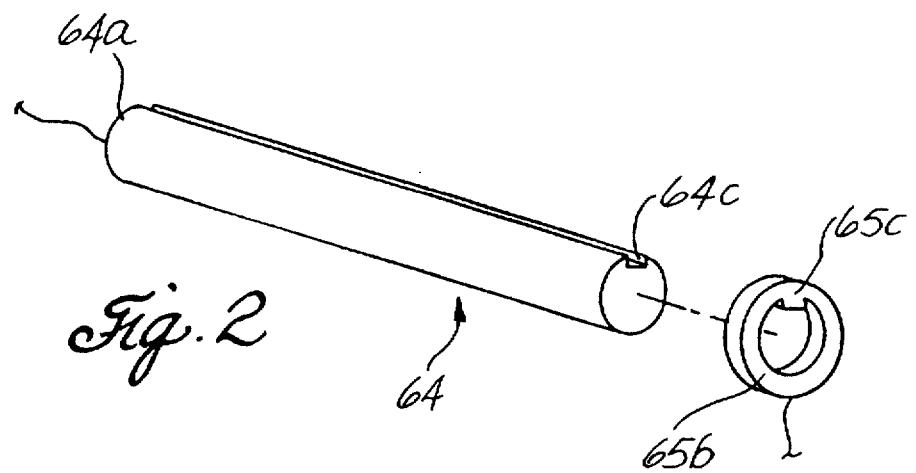
FIG. 2 is an exploded perspective view showing both a resistor and a movable pin of the injection system of this invention.
Figure 3:
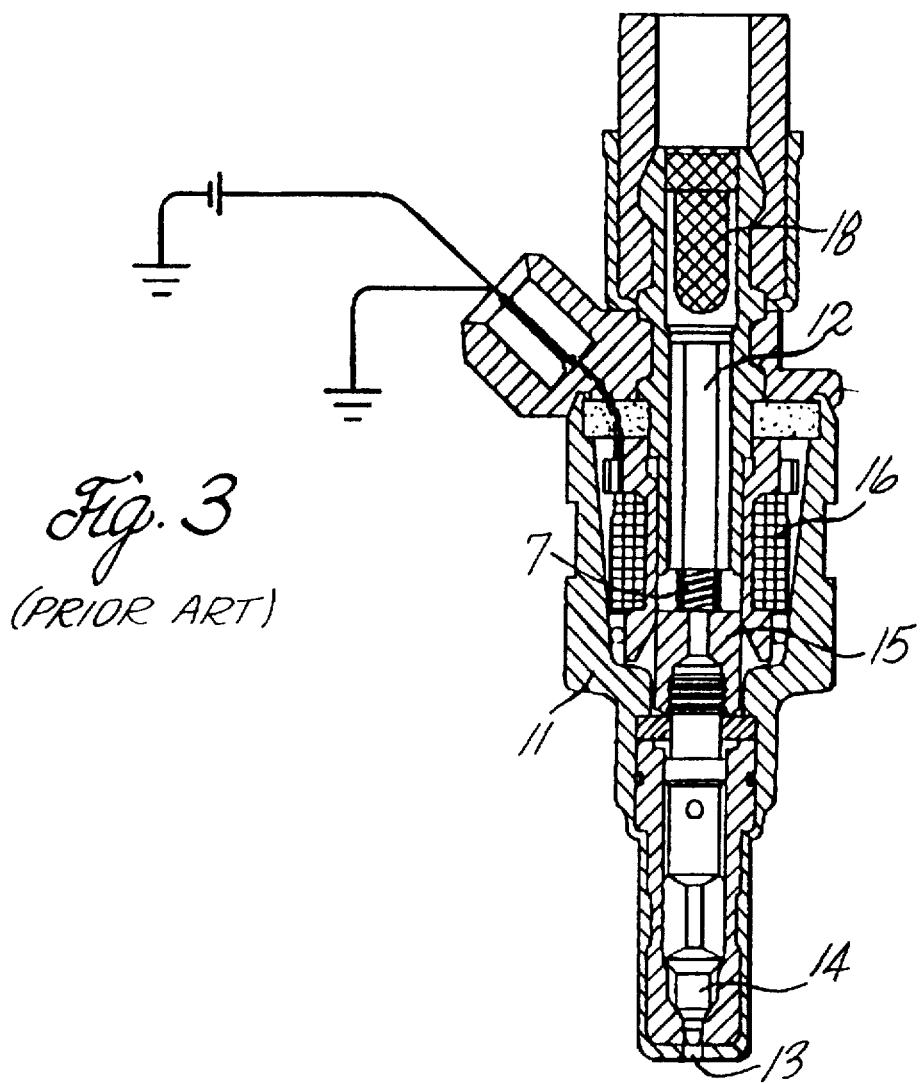
FIG. 3 is a sectional view showing the construction of a typical fuel injector for internal combustion engines.

FIG. 1 shows the construction of a variable fuel injection system for internal combustion engines of this invention. FIG. 2 shows both a resistor and a movable pin of the above injection system.

As shown in the drawings, the fuel injection system of this invention is comprised of two control units, that is, a first control unit 60 used for controlling the electromotive force for the solenoid coil 56 of an injector 50 and a second control unit 70 used for controlling the amount of oil for the first control unit 60 in accordance with an engine load.

The first control unit 60 is comprised of a cylinder 62. A longitudinal resistor 64 is axially and fixedly arranged in the cylinder 62 with the tip 64a of the resistor 64 being connected to a power source E. A movable member 65 is received in the cylinder so as to be linearly movable along the longitudinal resistor 64. The movable member 65 selectively receives electricity of the power source E through the resistor 64, thus applying electromotive force to a solenoid coil 56 of the injector 50. The first control unit 60 also includes a hydraulic chamber 67 and a return spring 68. The hydraulic chamber 67 is formed between the left end of the movable member 65 and the cylinder 62, thus selectively pushing the member 65 to a direction remote from the tip 64a of the resistor 64. Meanwhile, the return spring 68 is received in the cavity between the right end of the movable member 65 and the cylinder 62, thus normally biasing the movable member 65 to the tip 64a of the resistor 64. The movable member 65 is comprised of a piston 65a and a movable pin 65b. The piston 65a is movably fitted over the resistor 64, while the movable pin 65b is positioned in front of the piston 65a and selectively receives electricity of the power source E through the resistor 64, thus applying electromotive force to the solenoid coil 56 of the injector 50.

As shown in FIG. 2, the longitudinal resistor 64 is comprised of a cylindrical rod 64a with an axial groove 64c being formed on the rod 64a. The movable pin 65b is an annular body with an inner projection 65c being radially formed on the inside edge of the annular body at a position corresponding to the axial groove 64c of the resistor 64. The movable pin 65b is movably fitted over the resistor 64 with the inner projection 65c being received in the axial groove 64c of the resistor 64.

In the first control unit 60, the cylinder 62, piston 65a and return spring 68 are all preferably made of an insulating material.

Meanwhile, the second control unit 70 is comprised of an oil tank 75, which is connected to the hydraulic chamber 67 of the cylinder 62 through an oil supply pipe 72. A pump P is mounted to the oil supply pipe 72, thus pumping oil from the tank 75 into the hydraulic chamber 67. A solenoid valve 74 is mounted to the oil supply pipe 72 at a position between the pump P and the cylinder 62. The second control unit 70 also includes an electric control unit (ECU) 76, which controls the solenoid valve 74 in accordance with an engine load. A bypass pipe 77 extends from the hydraulic chamber 67 of the cylinder 62 to the oil tank 75, thus selectively returns pressurized oil from the hydraulic chamber 67 to the tank 75. In the second control unit 70, the diameter of the bypass pipe 77 is smaller than that of the oil supply pipe 72.

The operational effect of the above injection system will be described hereinbelow.

When an engine, with the above system, is started, the ECU 76 primarily determines an engine load prior to controlling the opening area of solenoid valve 74. Therefore, the solenoid valve 74 is appropriately opened under the control of the ECU 76, thus supplying pressurized oil to the hydraulic chamber 67 of the first control unit 60 through the oil supply pipe 72. When the amount of inlet oil for the hydraulic chamber 67 is more than return oil passing through the bypass pipe 77, the piston 65a moves to the right along the resistor 64 while compressing the return spring 68. In such a case, the movable pin 65b moves to the same direction along with the piston 65a.

The resistor 64 in the above state is turned on, thus receiving electricity from the power source E. In such a case, electromotive force, which is applied to the solenoid coil 56 of the injector 50 from the movable pin 65b, varies in accordance with a distance between the tip 64a of the resistor 64 and the movable pump 65b. That is, such electromotive force is in reverse proportion to the length of the resistor 64 and so the electromotive force for the solenoid coil 56 is increased with the movable pin 65b being positioned close to the tip 64a of the resistor 64. On the other hand, the electromotive force for the solenoid coil 56 is reduced with the movable pin 65b being positioned remote from the tip 64a of the resistor 64.

Therefore, in the event of a high engine load, the ECU 76 controls the solenoid valve 74 so as to reduce the opening area of the valve 74 and to reduce the amount of pressurized oil for the hydraulic chamber 67 of the cylinder 62. In such a case, the amount of return oil, which is returned from the cylinder 62 to the oil tank 75 through the bypass pipe 77, is more than inlet oil for the hydraulic chamber 67. Therefore, the piston 65a is biased to the tip 64a of the resistor 64 by the return spring 68, thus reducing the distance between the tip 64a and the movable pin 65b and increasing the electromotive force for the solenoid coil 56 of the injector 50. The retraction distance of the plunger 55, with the needle valve 54, in the injector body is increased in proportion to such increased electromotive force, thus increasing the opening area of the nozzle 53 and allowing the nozzle 53 to inject a large amount of fuel into the combustion chamber of the engine in a given time.

On the other hand, in the event of a low engine load, the ECU 76 controls the solenoid valve 74 so as to increase the opening area of the valve 74 and to increase the amount of pressurized oil for the hydraulic chamber 67 of the cylinder 62. In such a case, the amount of inlet oil for the hydraulic chamber 67 is more than the amount of return oil. Therefore, the piston 65a is moved remote from the tip 64a of the resistor 64, thus increasing the distance between the tip 64a and the movable pin 65b and reducing the electromotive force for the solenoid coil 56 of the injector 50. Due to the reduced electromotive force, the retraction distance of the plunger 55, with the needle valve 54, in the injector body is reduced, thus reducing the opening area of the nozzle 53 and allowing the nozzle 53 to inject a small amount of fuel into the combustion chamber of the engine in a given time.

As described above, the present invention provides a variable fuel injection system for internal combustion engines. The fuel injection system of this invention controls electromotive force for the solenoid coil of a fuel injector in accordance with an engine load, thus controlling the opening area of a fuel injection nozzle and controllably feeding fuel into the combustion chamber of an engine according to the engine load. The system thus conserves fuel with the amount of harmful exhaust gas being reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A variable fuel injection system for internal combustion engines, comprising a fuel injector provided with a solenoid coil for controlling a fuel injection nozzle, further comprising:

a first control unit adapted for controlling electromotive force for said solenoid coil of the fuel injector, thus controlling the amount of fuel to be injected from the nozzle; and a second control unit adapted for controlling an amount of oil for said first control unit in accordance with an engine load, thus allowing the first control unit to control the electromotive force for said solenoid coil according to the engine load.

2. The variable fuel injection system according to claim 1, wherein said first control unit comprises:

a cylinder;

a longitudinal resistor axially and fixedly arranged in said cylinder with the tip of said resistor being connected to a power source;

a movable member received in said cylinder so as to be selectively and linearly movable along said resistor, said movable member selectively receiving electricity of the power source through the resistor, thus applying electromotive force to said solenoid coil;

a variable hydraulic chamber defined in said cylinder by the movable member and adapted for selectively pushing the movable member to a direction remote from said tip of the resistor; and a return spring normally biasing the movable member to said tip of the resistor.

3. The variable fuel injection system according to claim 2, wherein said second control unit comprises:

an oil supply pipe adapted for applying oil to said hydraulic chamber of the cylinder;

a bypass pipe adapted for returning the oil from said hydraulic chamber, said bypass pipe having a diameter smaller than that of said oil supply pipe;

a solenoid valve mounted to said oil supply pipe, thus controlling the opening area of the oil supply pipe; and an electric control unit adapted for controlling said solenoid valve in accordance with the engine load.

* * * * *